(12) United States Patent
Hammond, Jr.

(10) Patent No.: US 10,514,291 B2
(45) Date of Patent: Dec. 24, 2019

(54) REDEMPTIVE WORK OF JESUS CHRIST DEMONSTRATED ON BALANCE SCALE

(71) Applicant: John Francis Hammond, Jr., Broken Arrow, OK (US)

(72) Inventor: John Francis Hammond, Jr., Broken Arrow, OK (US)

( * ) Notice: Subject to any disclaimer, the term of this patent is extended or adjusted under 35 U.S.C. 154(b) by 0 days.

(21) Appl. No.: 16/517,531

(22) Filed: Jul. 19, 2019

(65) Prior Publication Data

US 2019/0339109 A1 Nov. 7, 2019

Related U.S. Application Data

(63) Continuation-in-part of application No. 16/478,937, filed as application No. PCT/US2018/015794 on Jan. 29, 2018, which is a continuation-in-part of application No. 15/421,485, filed on Feb. 1, 2017, now Pat. No. 10,431,121, which is a
(Continued)

(51) Int. Cl.
| | |
|---|---|
| *G01G 1/20* | (2006.01) |
| *G09B 19/00* | (2006.01) |
| *G09B 1/04* | (2006.01) |
| *A47G 33/00* | (2006.01) |

(52) U.S. Cl.
CPC .............. *G01G 1/20* (2013.01); *A47G 33/00* (2013.01); *G09B 1/04* (2013.01); *G09B 19/00* (2013.01)

(58) Field of Classification Search
CPC .......... A47G 33/02; A47G 33/00; G09B 1/04; G09B 19/00; G01G 1/18; G01G 1/20; G01G 1/22; G01G 1/00; G01G 23/20
See application file for complete search history.

(56) References Cited

U.S. PATENT DOCUMENTS

| | | | |
|---|---|---|---|
| 1,257,547 A | 2/1918 | Templeton | |
| D135,388 S * | 3/1943 | Cannon | G09B 25/00 |
| | | | D19/97 |

(Continued)

FOREIGN PATENT DOCUMENTS

GB 650205 2/1951

OTHER PUBLICATIONS

Woman of Faith in Christ, Growing Gardens in Marriage (no scales needed), http://womanoffailhinchrist.blogspot.com/2014/08/growing-gardens-in-marriage-no-scales.hlml, Sunday, Aug. 17, 2014 (copy not available but as cited by examiner in 14802990).

*Primary Examiner* — Randy W Gibson
(74) *Attorney, Agent, or Firm* — Margaret Millikin

(57) ABSTRACT

This invention involves a balance scale with a base, a balance arm support, a balance arm, a pointer, a counterbalance, a movable label plate containing descriptions and an optional parallel beam. The balance arm has a tray on each end, where one tray holds an article representing mankind with sin, and the other tray holds an article representing the redemptive work of Jesus Christ. The articles on each tray are of equal or approximately equal weight. The scale rotates when the weight of the articles are added to or removed from the trays, and the scale rotation will determine which description the pointer will point to. This invention can be used as a Christian teaching aid showing the benefit of choosing to accept the death of Christ as payment in full for our sins, along with showing the consequence of our refusal to accept the death of Christ as payment for our sins.

12 Claims, 14 Drawing Sheets

Related U.S. Application Data continuation-in-part of application No. 14/802,990, filed on Jul. 17, 2015, now abandoned.

(56) References Cited

U.S. PATENT DOCUMENTS

| | | | | |
|---|---|---|---|---|
| 2,325,683 | A | * | 7/1943 | Kayden .................. A47J 31/42 99/286 |
| 2,347,681 | A | * | 5/1944 | Goudreau .............. A47G 33/02 206/19 |
| 2,381,268 | A | | 8/1945 | Eastman |
| D155,162 | S | | 9/1949 | Jensen |
| D158,744 | S | | 12/1949 | Hadley |
| 2,528,913 | A | * | 11/1950 | Robinson ............... A47G 33/02 206/19 |
| 2,567,161 | A | | 9/1951 | Griffin |
| 3,000,114 | A | | 10/1959 | Orlov |
| 3,562,926 | A | | 2/1971 | Koral |
| 3,742,619 | A | | 7/1973 | Jenks |
| 3,885,639 | A | * | 5/1975 | McLarrin ................. G01G 1/18 177/172 |
| 4,240,213 | A | | 12/1980 | Lutin |
| 4,871,314 | A | | 10/1989 | Shih |
| D443,970 | S | * | 6/2001 | Stucker .......................... D99/23 |
| 6,974,327 | B2 | | 12/2005 | Timpe et al. |
| D611,375 | S | | 3/2010 | Lin |
| D618,135 | S | * | 6/2010 | Horst ..................... A47J 31/42 D11/157 |
| 8,591,234 | B1 | | 11/2013 | Ratcliffe |
| 2017/0013989 | A1 | * | 1/2017 | Hammond, Jr. ....... A47G 33/00 |
| 2017/0140675 | A1 | * | 5/2017 | Hammond, Jr. ....... G09B 25/00 |
| 2018/0174478 | A1 | * | 6/2018 | Seymour ............... G09B 19/00 |

* cited by examiner

REDEMPTIVE WORK OF JESUS CHRIST DEMONSTRATED ON BALANCE SCALE

CROSS-REFERENCE TO RELATED APPLICATIONS

The present application is a continuation-in-part of co-pending U.S. patent application Ser. No. 16/478,937, entitled Redemptive Work of Jesus Christ Demonstrated on Balance Scale, filed Jul. 18, 2019, which is a national stage application of co-pending International Application No. PCT/US18/015794, Redemptive Work of Jesus Christ Demonstrated on Balance Scale, filed Jan. 29, 2018, which is a continuation-in-part of co-pending U.S. patent application Ser. No. 15/421,485, entitled Redemptive Work of Jesus Christ Demonstrated on Balance Scale, filed Feb. 1, 2017, which is a continuation-in-part of U.S. patent application Ser. No. 14/802,990, entitled Redemptive Work of Jesus Christ Demonstrated on Balance Scale, filed Jul. 17, 2015, now abandoned, the entire contents of all of which are incorporated herein by reference.

BACKGROUND OF THE INVENTION

1. Field of the Invention

The present invention is a balance scale that is designed to depict and teach the significance of the death, burial and resurrection of Jesus Christ and how the sacrifice of Jesus is available to save mankind from their sins.

2. Description of the Related Art

From a Christian perspective, Jesus Christ of Nazareth died on a cross to pay the penalty for the sins of mankind. For those who choose to believe, Jesus freed mankind from the bondage of sin. As it is written in the Gospel of John, Jesus said "It is finished" just before He died. Another form of this saying is "Paid in full!"

This invention demonstrates the redemptive work of Jesus Christ on a balance scale, showing that mankind's sin has been paid in full by Jesus' ransom sacrifice. Put another way, God's remedy for mankind's sin problem was the death of His own Son, God has accepted His Son's death as payment for everyone's sin, but if we refuse to accept Jesus' death by faith, then the penalty of our sins remains upon us and our sin debt is still counted against us, as demonstrated on the scale.

The self-righteousness of mankind is considered to be the equivalent of filthy rags in the eyes of our God, as it is written in the Book of Isaiah. Furthermore, written in the Book of Romans, "There is none righteous, no, not one." Therefore, from a Christian perspective, we attain righteousness by having faith in the completed work of Jesus Christ. Through faith in Jesus Christ, the sin debt that was charged against us has been paid in full, and on a balance scale demonstration, the debt that was originally owed has been off-set by the payment made through the atoning death of Christ. Put another way, we have a debt that we cannot pay and Jesus paid a debt that He didn't owe. This is demonstrated in a visual perspective on a balance scale.

SUMMARY OF THE INVENTION

This invention involves a loaded balance scale, where one side of the scale represents mankind in their sinful or natural state, and the other side of the scale represents the sacrificial work of Jesus Christ. Both sides of the scale have trays to hold articles that represent mankind and represent Christ, where the articles are of equal or approximately equal weight. The trays are supported on a balance arm, and the balance arm rotates on a pivot.

At or near the center of the balance arm is a pointer that rotates to a label plate, and the label plate has descriptions listed thereon. Alternatively, the label plate can be at or near the center of the balance arm and rotate to a pointer, and the label plate has descriptions listed thereon. The weight on the trays will determine which description the pointer will point to.

Even in our natural state, mankind has a sin problem that has been passed down from our first ancestors Adam and Eve. Therefore, this invention can be used as a Christian teaching aid showing the benefit of choosing to accept the death of Christ as payment in full for our sins, along with showing the consequence of our refusal to accept the death of Christ as payment for our sins.

DETAILED DESCRIPTION OF THE PREFERRED EMBODIMENT

Figure 1:
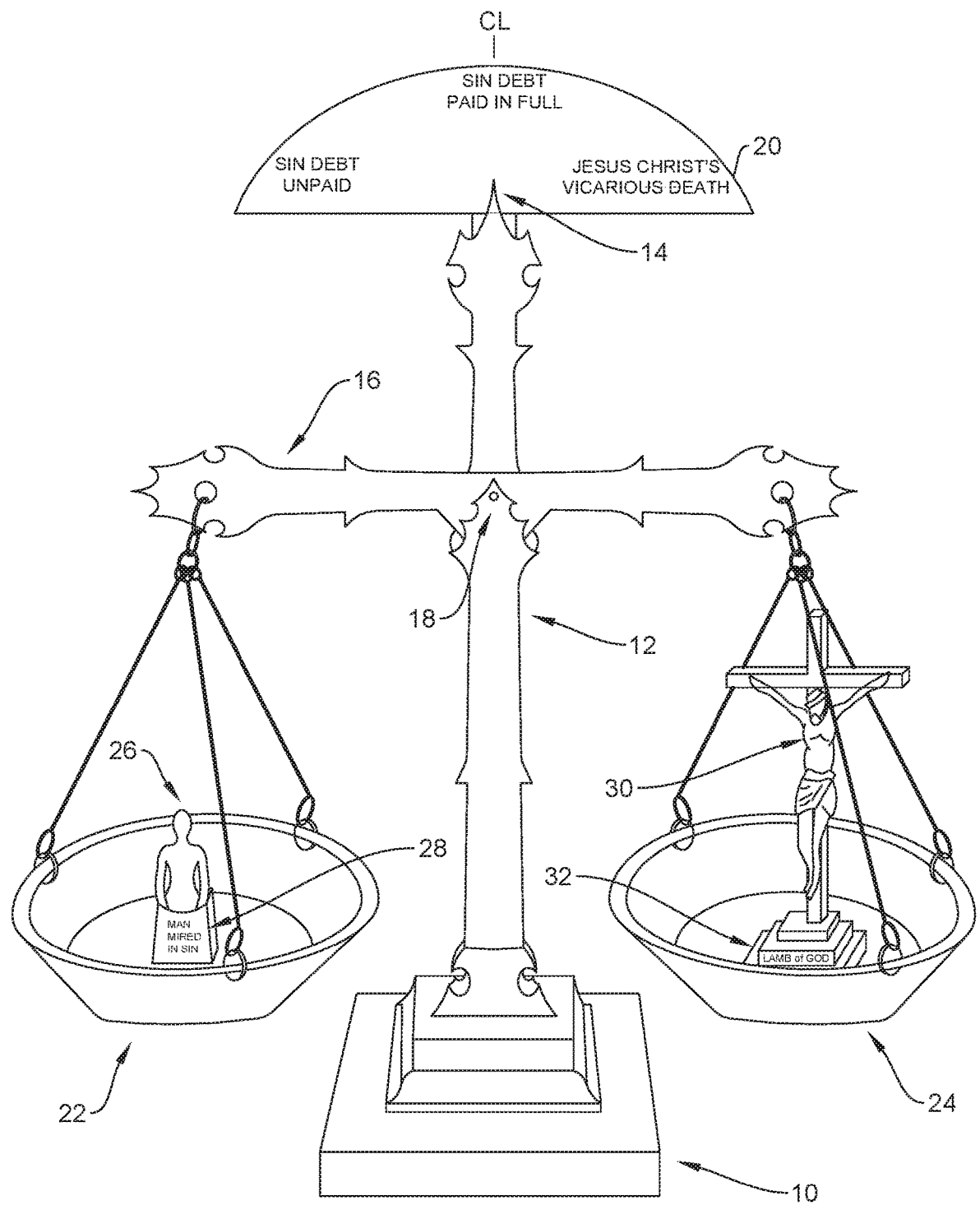
FIG. 1 is a frontal view of the balance scale with an article on each tray, where trays are in equilibrium, and the pointer is connected to the balance arm and pointing to a description on the label plate.

In the drawing, the base 10 supports the balance arm support 12, and the balance arm support holds the balance arm 16 which rotates on a pivot 18. At or near the center of the balance arm 16 is a pointer 14 that rotates to a label plate 20. The pointer may have a counter-balance on the opposite end to bring equally weighted trays to an even level. The label plate 20 has descriptions posted thereon which are listed in Table I.

Hanging one end of the balance arm 16 is a tray 24 that holds an article of Christ's redemption 30. A label 32 may be at or near the base of the article of Christ's redemption 30, and has descriptions which are listed in Table II.

Hanging on the other end of the balance arm 16 is a tray 22 that holds an article of mankind 26. A label 28 may be at or near the base of the article of mankind 26, and has descriptions which are listed in Table III.

The base 10, balance arm support 12, balance arm pivot 18, balance arm 16, trays 22 and 24, and pointer 14 are made from but not limited to metal, plastic, wood, hardboard, cardboard, composites, ceramic, glass, rubber, or any combination thereof.

The label plate 20 is made from but not limited to metal, plastic, wood, hardboard, cardboard, composites, ceramic, glass, rubber, or any combination thereof.

The article of Christ's redemption 30 is made from but not limited to metal, plastic, wood, hardboard, cardboard, composites, ceramic, glass, rubber, or any combination thereof.

The article of mankind 26 is made from but not limited to metal, plastic, wood, hardboard, cardboard, composites, ceramic, glass, rubber, or any combination thereof.

TABLE I

A. Article of Christ's Redemption on one tray and Article of Mankind on other tray. Description options can be but not limited to:
    1. SIN DEBT PAID IN FULL
    2. MANKIND BOUGHT AT A PRICE
    3. MANKIND BOUGHT BY CHRIST
B. Article of Mankind on one tray and Article of Christ's Redemption removed from other tray. Description options can be but not limited to:
    1. SIN DEBT UNPAID
    2. SIN DEBT STILL OWED
    3. SIN DEBT CHARGED AGAINST MANKIND
C. Article of Christ's Redemption on one tray and Article of Mankind removed from other tray. Description options can be but not limited to:
    1. JESUS CHRIST'S VICARIOUS DEATH
    2. JESUS CHRIST'S ATONING DEATH
    3. JESUS CHRIST'S RANSOM SACRIFICE

TABLE II

A. Description options can be but not limited to:
    1. LAMB OF GOD
    2. SON OF GOD
    3. BREAD OF LIFE
    4. SAVIOR OF THE WORLD
    5. LIGHT OF THE WORLD
    6. ROCK OF SALVATION
    7. THE WAY, THE TRUTH AND THE LIFE

TABLE III

Figure 2:
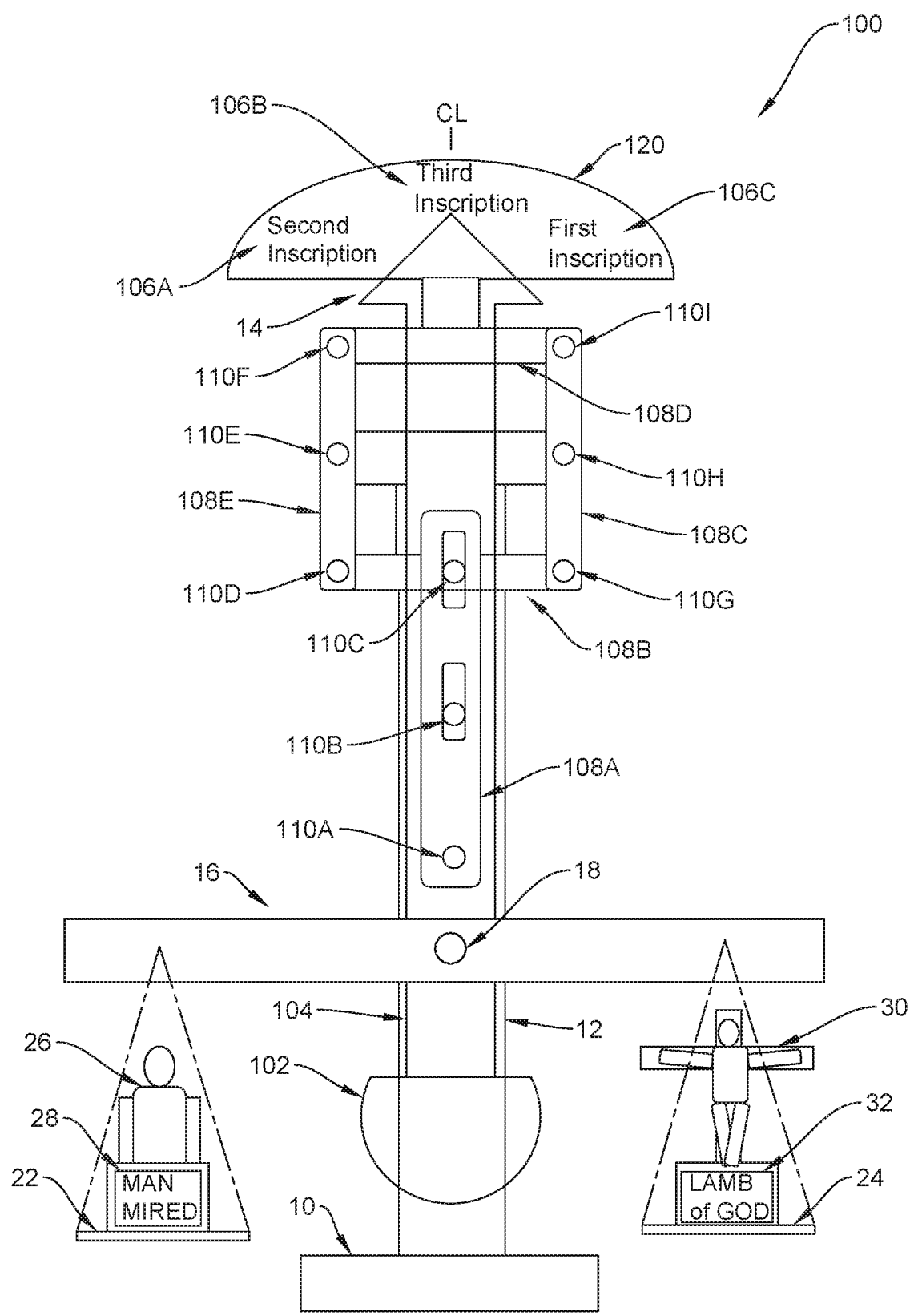
FIG. 2 is a frontal view of an alternate balance scale 100 shown with the trays of the scale in equilibrium.

A. Description options can be but not limited to:
    1. MAN MIRED IN SIN
    2. MAN BONDAGED TO SIN
    3. MAN BURDENED WITH SIN
    4. MAN'S SIN DEBT
    5. MAN'S SINFUL STATE
    6. MAN'S NATURAL STATE Referring now to FIGS. 2-6, there is illustrated an alternate balance scale 100 that is constructed in accordance with an alternate preferred embodiment. The alternate balance scale 100 includes a counter-balance 102 that is located at a lower end 104 of the pointer 14. The counter-balance 102 serves to help bring equally weighted trays 22 and 24 to an even level so that both the movable pointer 14 and the movable label plate 120 are aligned with the center line (as indicated by the letters CL in the drawings) of the alternate balance scale 100. This is depicted in FIG. 2 where the article of mankind 26 and the article of Christ's redemption 30 are of equal weight and are resting on trays 22 and 24, respectively.

Figure 3:
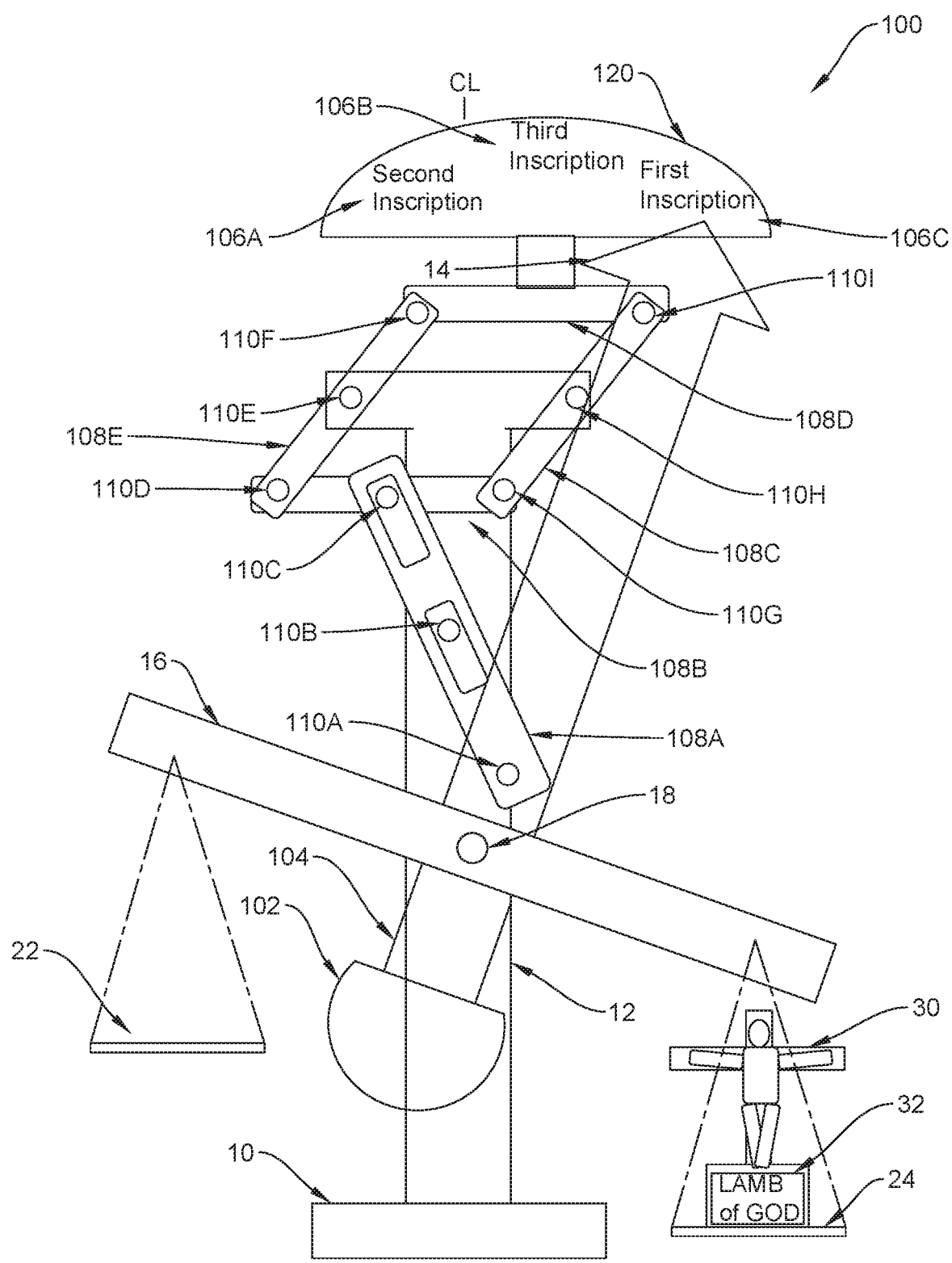
FIG. 3 is the alternate balance scale 100 of FIG. 2 shown with the sacrifice of Jesus alone.
Figure 4:
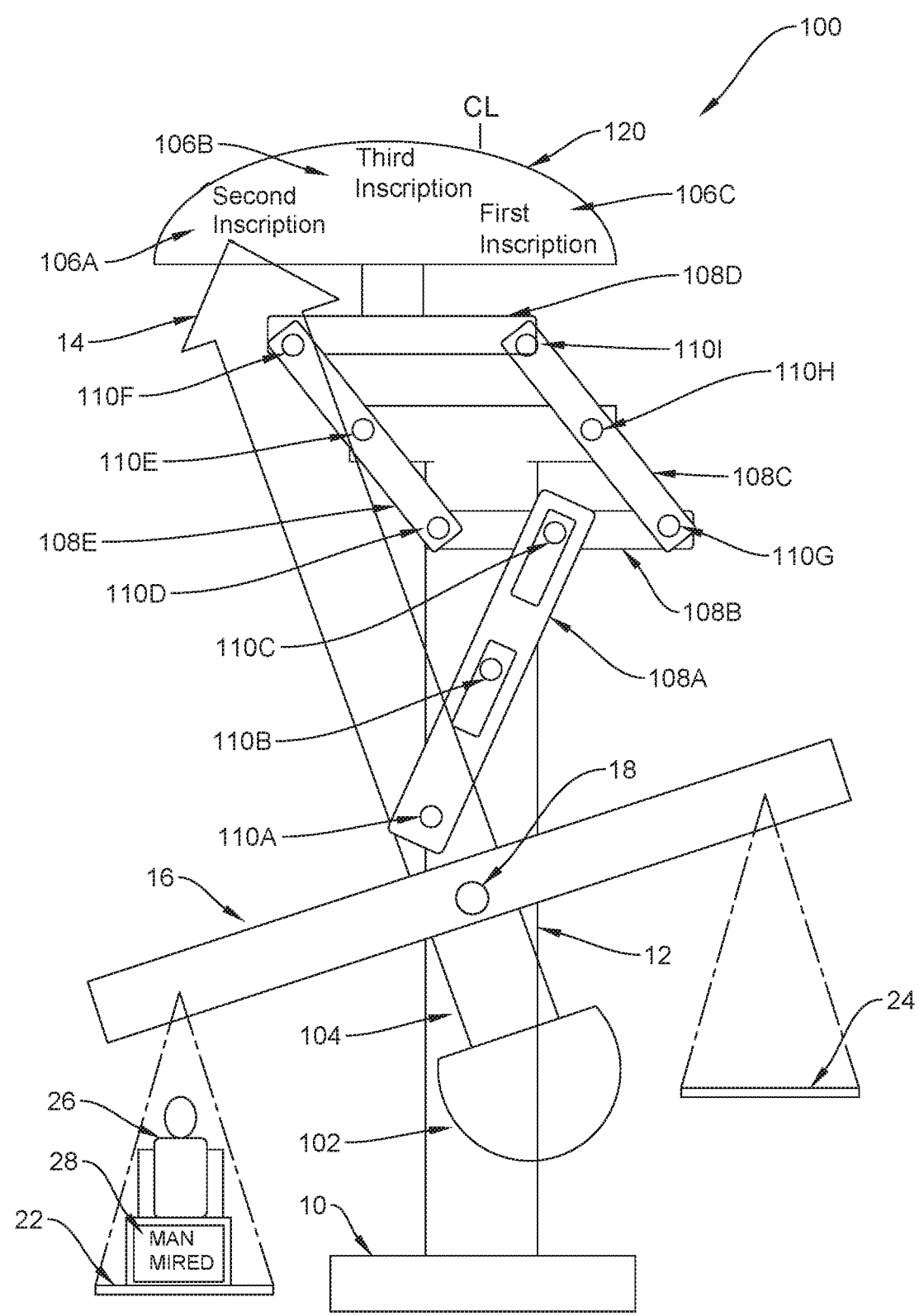
FIG. 4 is the alternate balance scale 100 of FIGS. 2 and 3 shown with the sins of man unredeemed by the sacrifice of Jesus.
Figure 5:
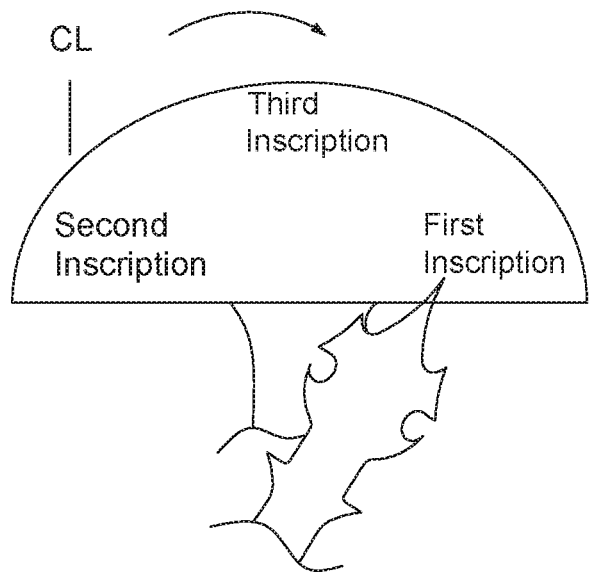
FIG. 5 is an enlarged view of the pointer and movable scale sign of FIG. 3 showing their relative movement with reference to the center line of the alternate balance scale.
Figure 6:
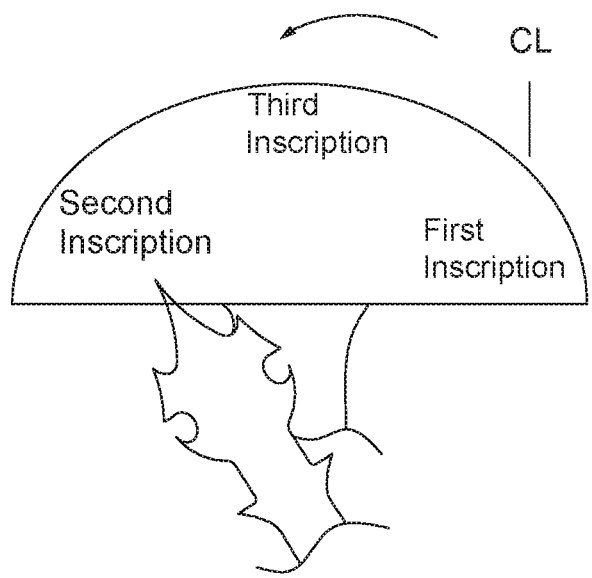
FIG. 6 is an enlarged view of the pointer and movable scale sign of FIG. 4 showing their relative movement with reference to the center line of the alternate balance scale.

Referring now to FIGS. 3 and 4, when only one of the articles 26 or 30 is resting on its respective tray 22 or 24, the alternate balance 100 is not in equilibrium and the pointer 14 and movable label plate 120 both move in the direction of the tray 22 or 24 on which the article 26 or 30 is resting. The movement of both the pointer 14 and the movable label plate 120 relative to the center line CL of the alternate balance scale 100 is illustrated in FIGS. 5 and 6. Although both the pointer 14 and the movable label plate 120 move in the same direction, their movement is not equal, but is proportional to each other, with the pointer 14 moving further than the movement of the movable label plate 120.

Movement of both the pointer 14 and the movable label plate 120 allows for alternate sizes of labels 106A, 106B and 106C on the movable label plate 120, provides flexibility if the movable label plate 120 is bumped, aides in visual centering of the pointer 14, and aids in the entertainment feature of the alternate balance scale 100.

In order for the movable label plate 120 to move in conjunction with the pointer 14 in this fashion, linkage of several pivoting arms 108A, 108B, 108C, 108D and 108E that are pivotally secured via pivot points 110A, 110B, 110C, 110D, 110E, 110F, 110G, 110H and 110I to the pointer 14 and to the vertical balance arm support 12 cooperate to cause movement of the movable label plate 120 in response to movement of the pointer 14, as illustrated in the drawings and particularly in FIGS. 3 and 4.

Figure 7:
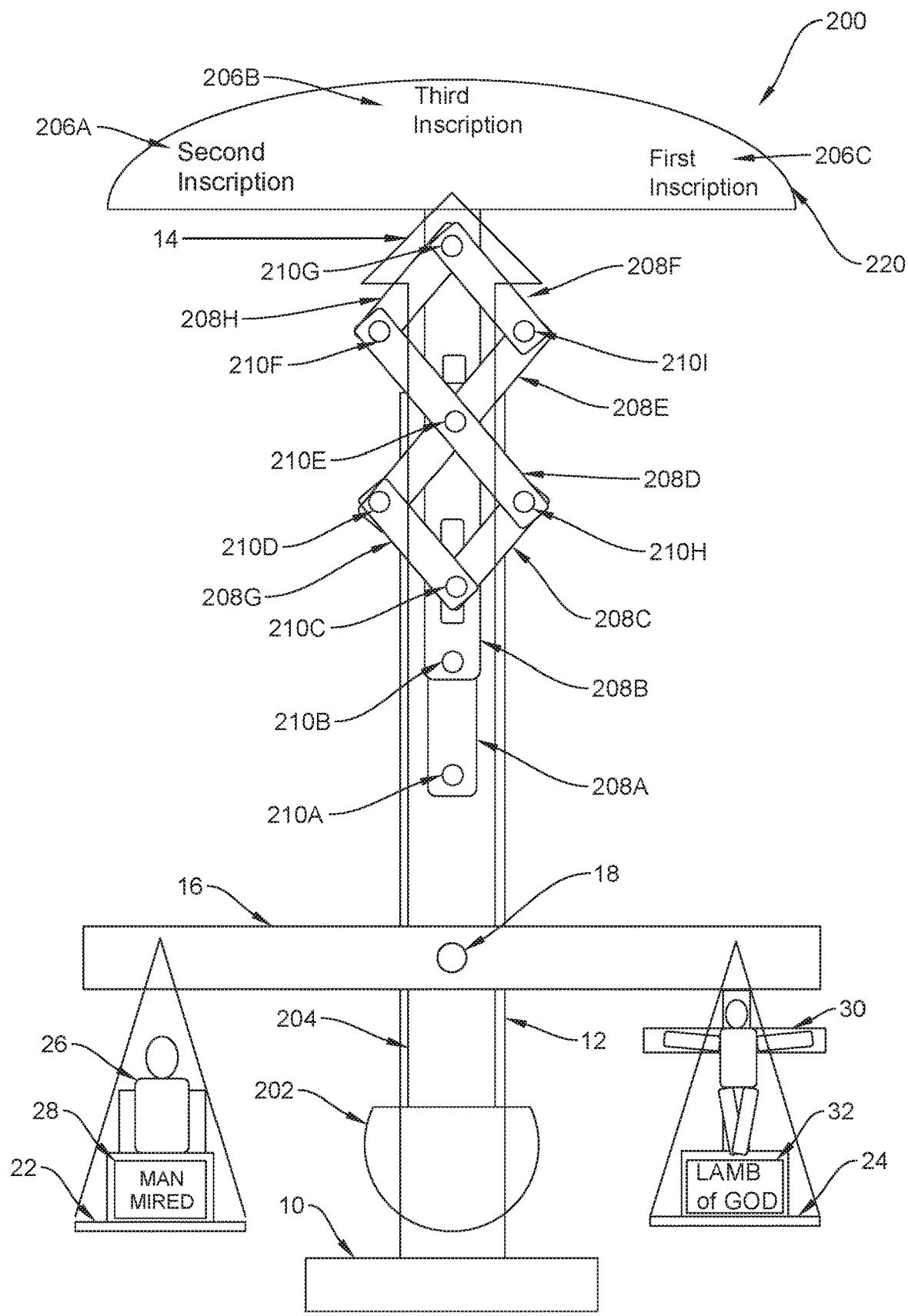
FIG. 7 is a frontal view of an alternate balance scale 200 shown with the trays of the scale in equilibrium.
Figure 8:
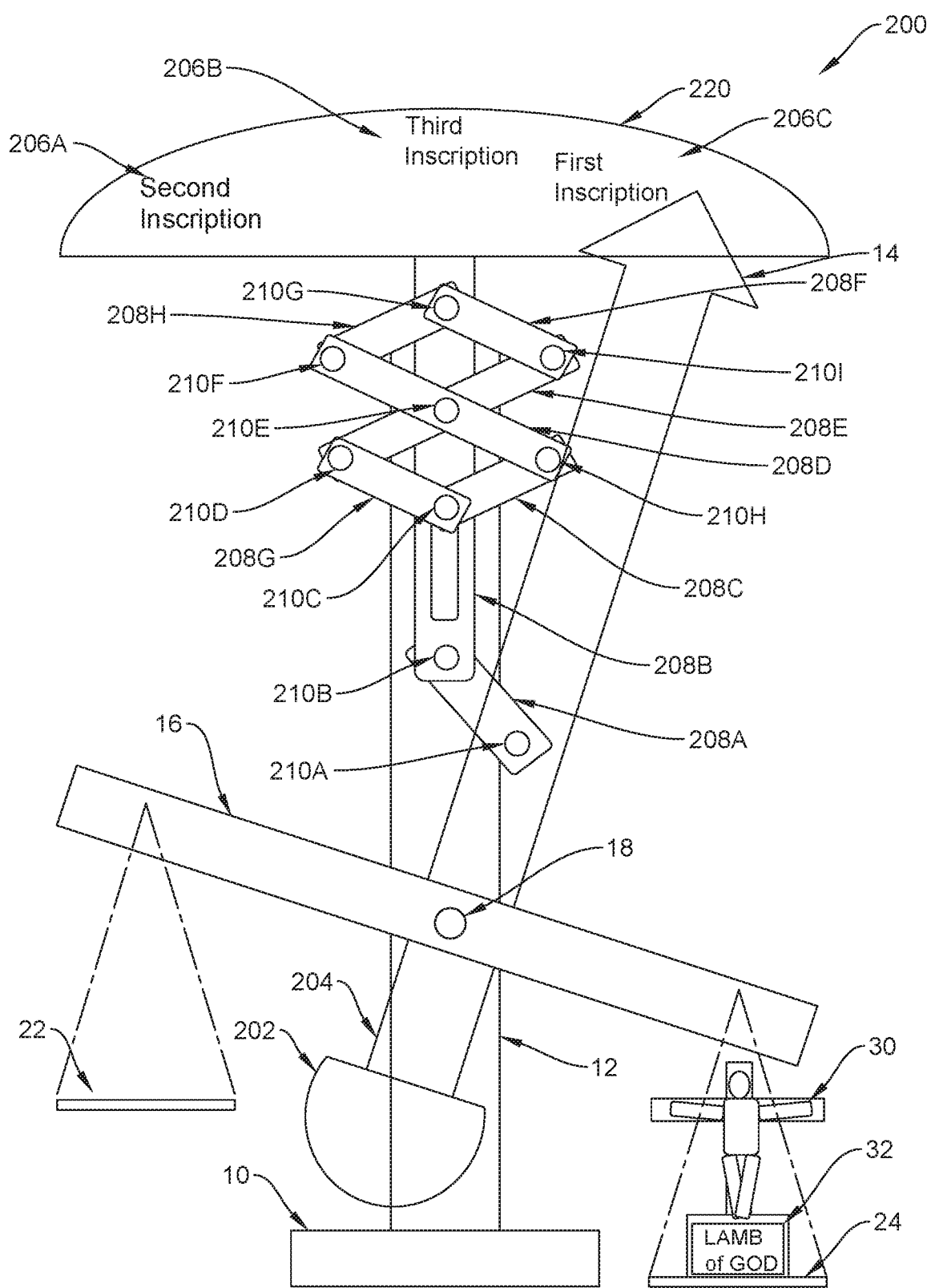
FIG. 8 is the alternate balance scale 200 of FIG. 7 shown with the sacrifice of Jesus alone.
Figure 9:
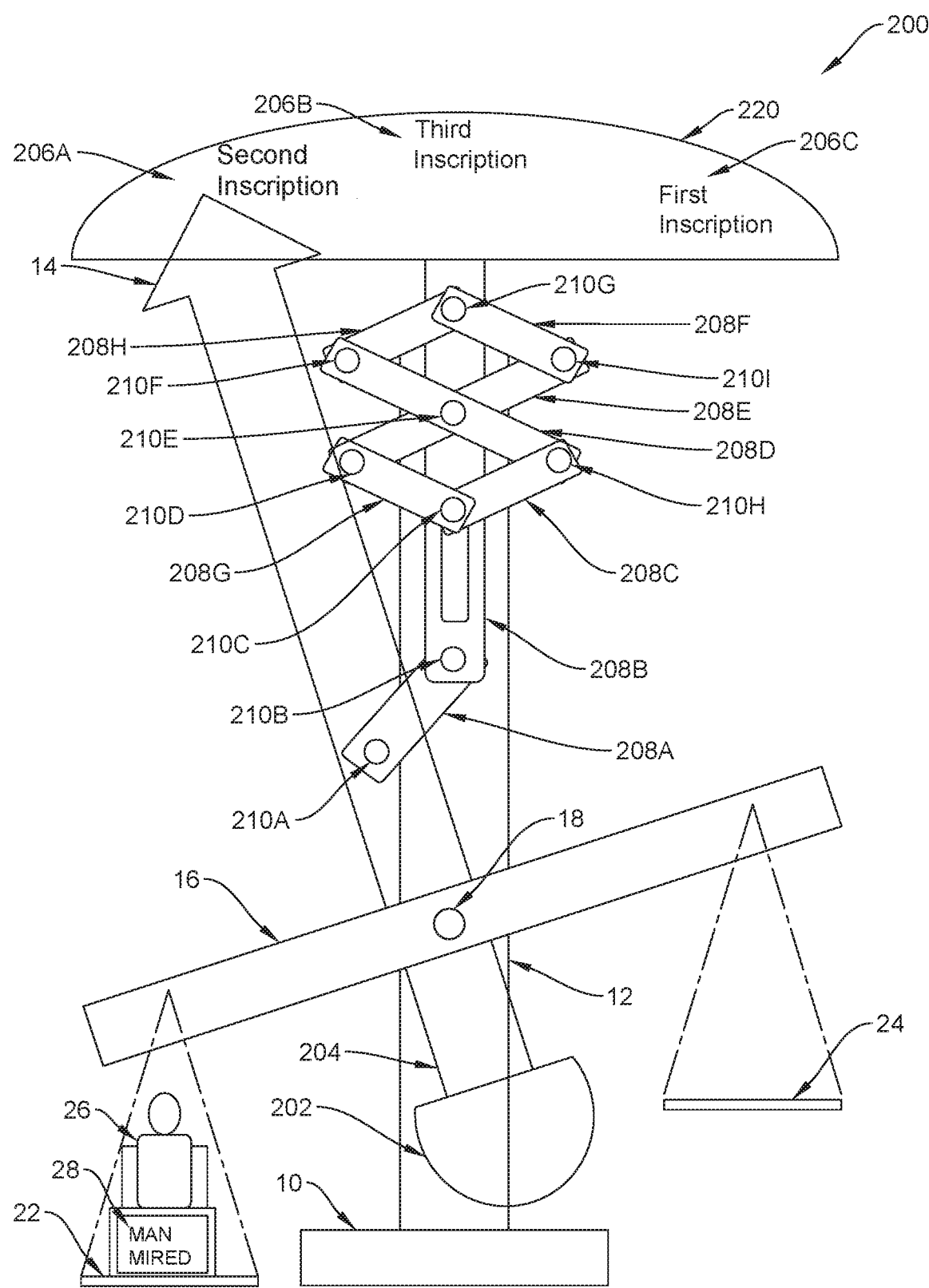
FIG. 9 is the alternate balance scale 200 of FIGS. 7 and 8 shown with the sins of man unredeemed by the sacrifice of Jesus.

Referring now to FIGS. 7-9, there is illustrated an alternate balance scale 200 that is constructed in accordance with an alternate preferred embodiment. The alternate balance scale 200 includes a counter-balance 202 that is located at a lower end 204 of the pointer 14. The counter-balance 202 serves to help bring equally weighted trays 22 and 24 to an even level so that both the movable pointer 14 and the movable label plate 220 are aligned with the center of the alternate balance scale 200. This is depicted in FIG. 7 where the article of mankind 26 and the article of Christ's redemption 30 are of equal weight and are resting on trays 22 and 24, respectively.

Referring now to FIGS. 8 and 9, when only one of the articles 26 or 30 is resting on its respective tray 22 or 24, the alternate balance 200 is not in equilibrium and the pointer 14 moves in the direction of the tray 22 or 24 on which the article 26 or 30 is resting, and the movable label plate 220 moves down. The movement of both the pointer 14 and the movable label plate 220 of the alternate balance scale 200 is illustrated in FIGS. 8 and 9.

Movement of both the pointer 14 and the movable label plate 220 allows for alternate sizes of labels 206A, 206B and 206C on the movable label plate 220, provides flexibility if the movable label plate 220 is bumped, aides in visual centering of the pointer 14, and aids in the entertainment feature of the alternate balance scale 200.

In order for the movable label plate 220 to move in conjunction with the pointer 14 in this fashion, linkage of several pivoting arms 208A, 208B, 208C, 208D, 208E, 208F, 208G and 208H that are pivotally secured via pivot points 210A, 210B, 210C, 210D, 210E, 210F, 210G, 210H and 210I to the pointer 14 and to the vertical balance arm support 12 cooperate to cause movement of the movable label plate 220 in response to movement of the pointer 14, as illustrated in the drawings and particularly in FIGS. 8 and 9.

Figure 10:
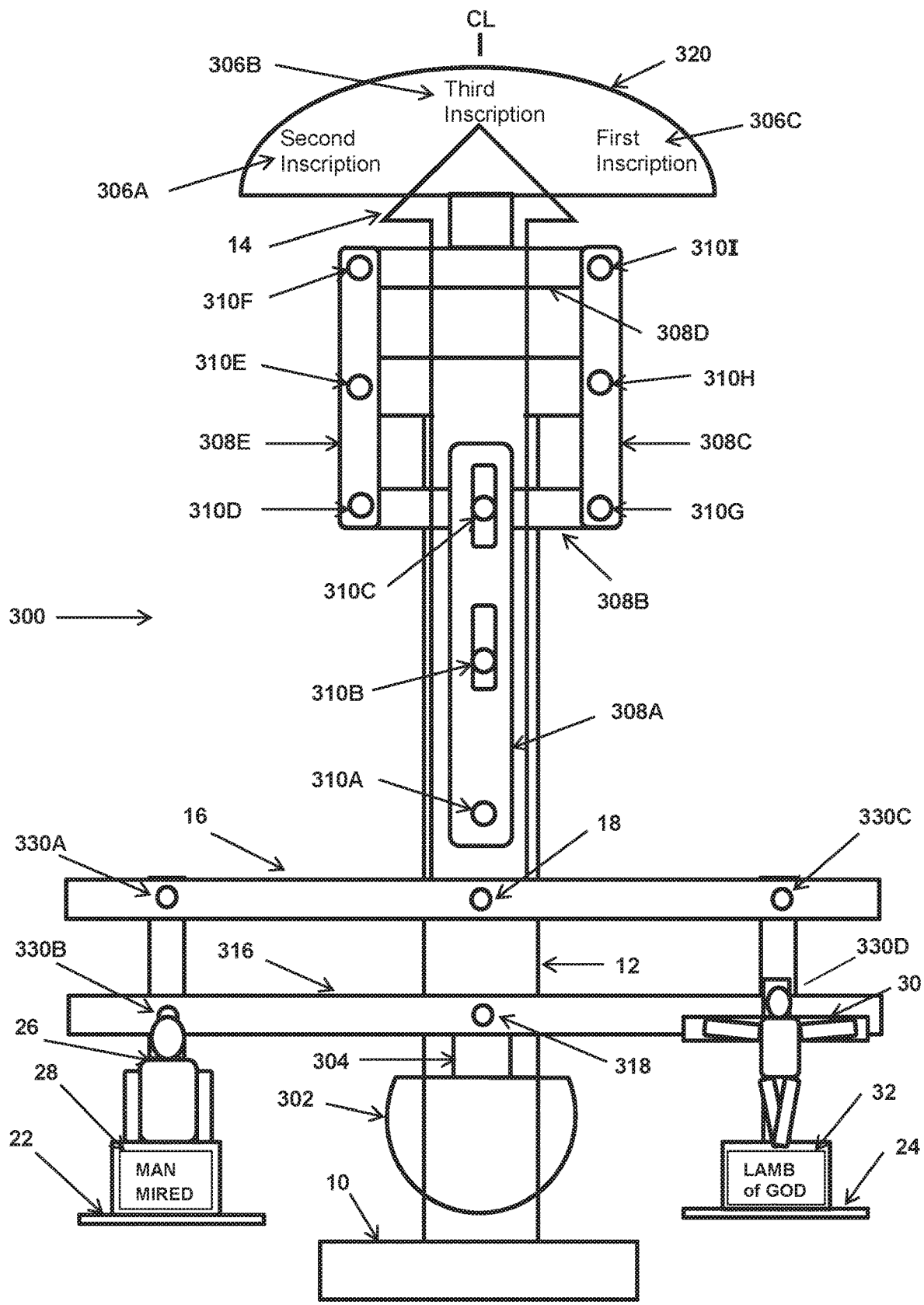
FIG. 10 is a frontal view of an alternate balance scale 300 shown with the trays of the scale in equilibrium.
Figure 11:
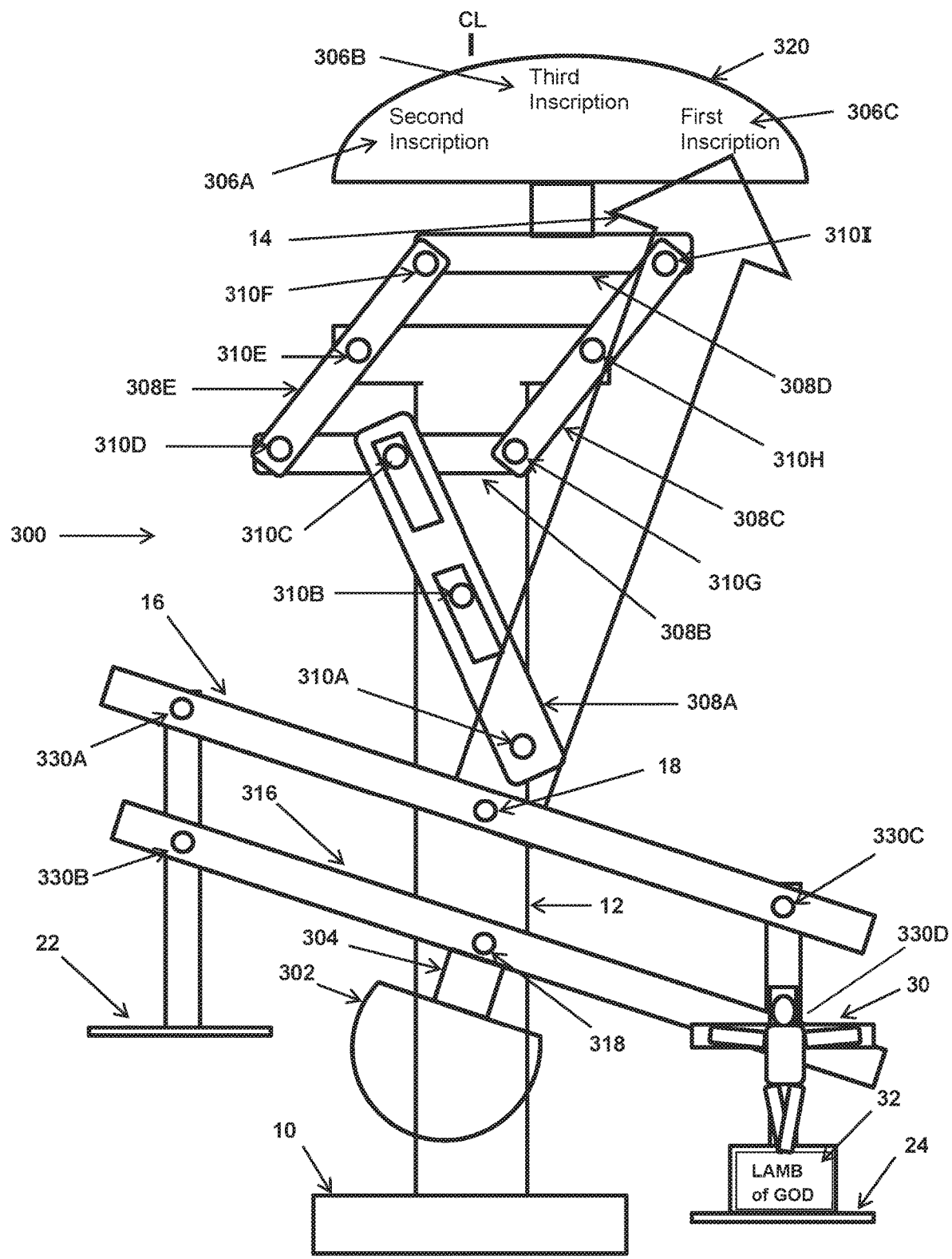
FIG. 11 is the alternate balance scale 300 of FIG. 10 shown with the sacrifice of Jesus alone.
Figure 12:
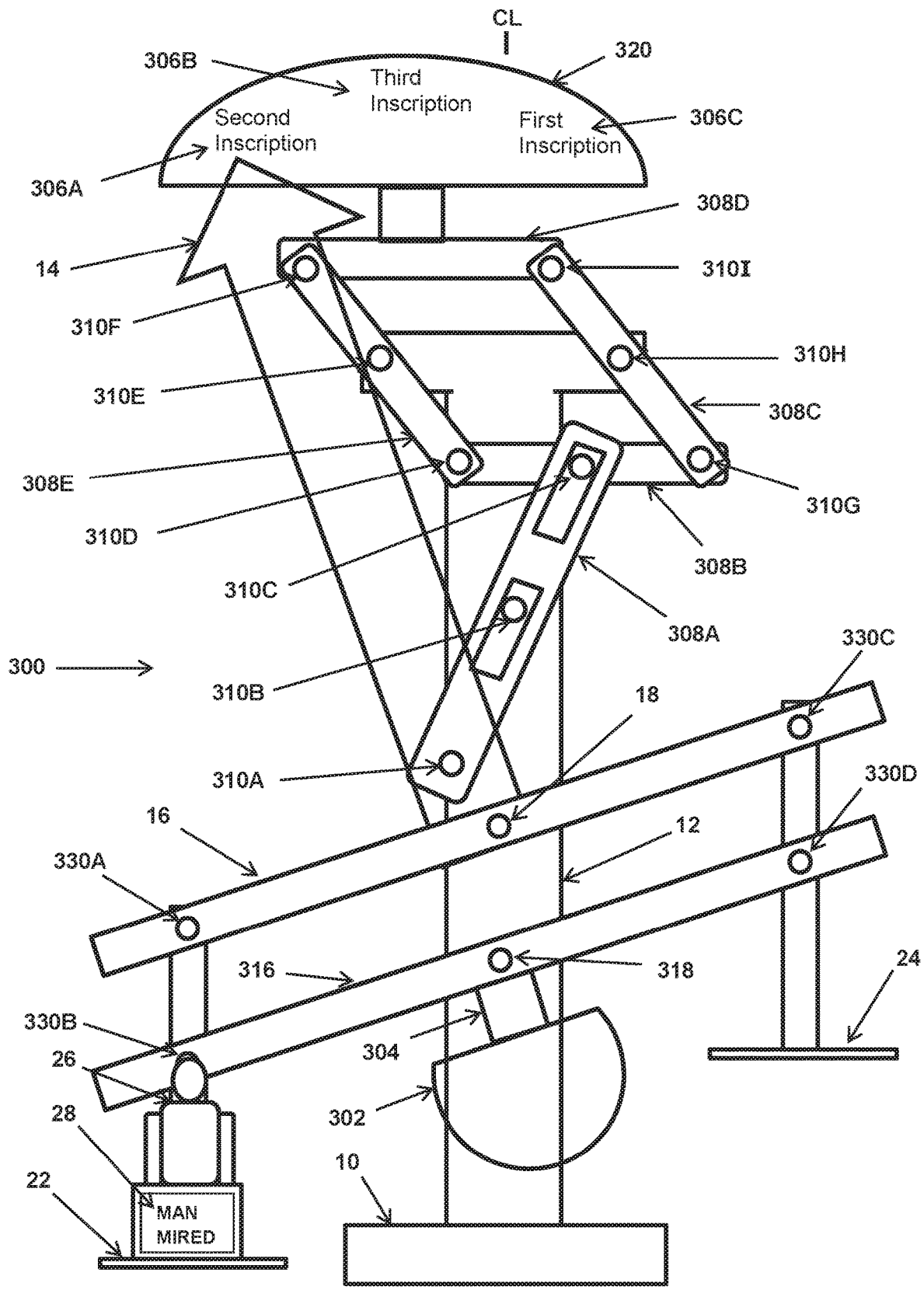
FIG. 12 is the alternate balance scale 300 of FIGS. 10 and 11 shown with the sins of man unredeemed by the sacrifice of Jesus.

Referring now to FIGS. 10-12, there is illustrated an alternate balance scale 300 that is constructed in accordance with an alternate preferred embodiment. The alternate balance scale 300 includes a counter-balance 302 that is located at either a lower end 304 of the pointer 14 or the bottom side of a parallel beam 316, or both, which rotates on a pivot 318. The counter-balance 302 serves to help bring equally weighted trays 22 and 24 to an even level so that both the movable pointer 14 and the movable label plate 320 are aligned with the center line (as indicated by the letters CL in the drawings) of the alternate balance scale 300. This is depicted in FIG. 10 wherein the article of mankind 26 and the article of Christ's redemption 30 are of equal weight and are resting on trays 22 and 24, respectively. The trays 22 and 24 are pivotally secured via pivot points 330A, 330B, 330C and 330D to the balance arm 16 and parallel beam 316.

Referring now to FIGS. 11 and 12, when only one of the articles 26 or 30 is resting on its respective tray 22 or 24, the alternate balance 300 is not in equilibrium and the pointer 14 and movable label plate 320 both move in the direction of the tray 22 or 24 on which the article 26 or 30 is resting. The movement of both the pointer 14 and the movable label plate 320 relative to the center line CL of the alternate balance scale 300 is illustrated in FIGS. 5 and 6. Although both the pointer 14 and the movable label plate 320 move in the same direction, their movement is not equal, but is proportional to each other, with the pointer 14 moving further than the movement of the movable label plate 320.

Movement of both the pointer 14 and the movable label plate 320 allows for alternate sizes of labels 306A, 306B and 306C on the movable label plate 320, provides flexibility if the movable label plate 320 is bumped, aides in visual centering of the pointer 14, and aids in the entertainment feature of the alternate balance scale 300.

In order for the movable label plate 320 to move in conjunction with the pointer 14 in this fashion, linkage of several pivoting arms 308A, 308B, 308C, 308D and 308E that are pivotally secured via pivot points 310A, 310B, 310C, 310D, 310E, 310F, 310G, 310H and 310I to the pointer 14 and to the vertical balance arm support 12 cooperate to cause movement of the movable label plate 320 in response to movement of the pointer 14, as illustrated in the drawings and particularly in FIGS. 11 and 12.

Figure 13:
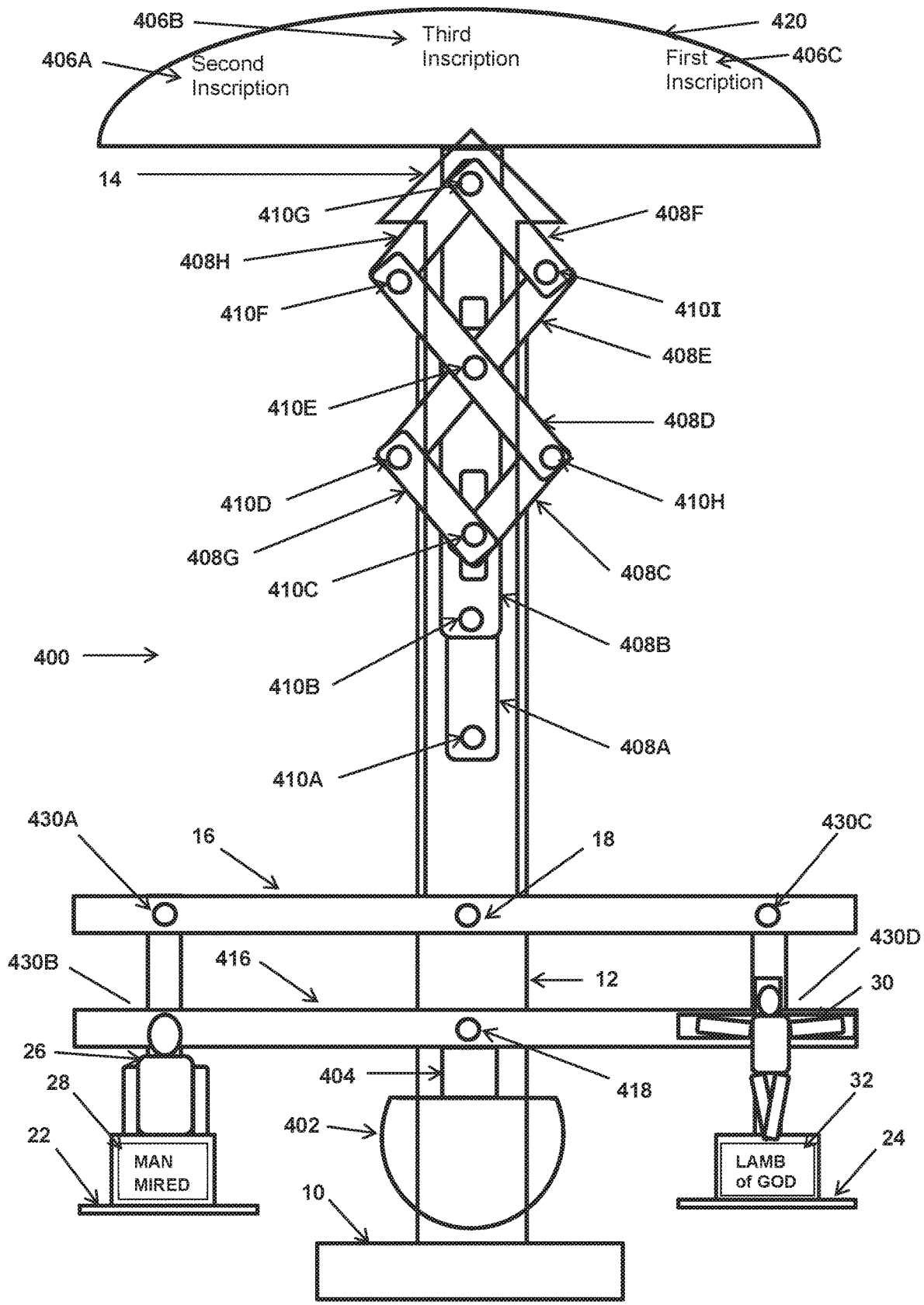
FIG. 13 is a frontal view of an alternate balance scale 400 shown with the trays of the scale in equilibrium.
Figure 14:
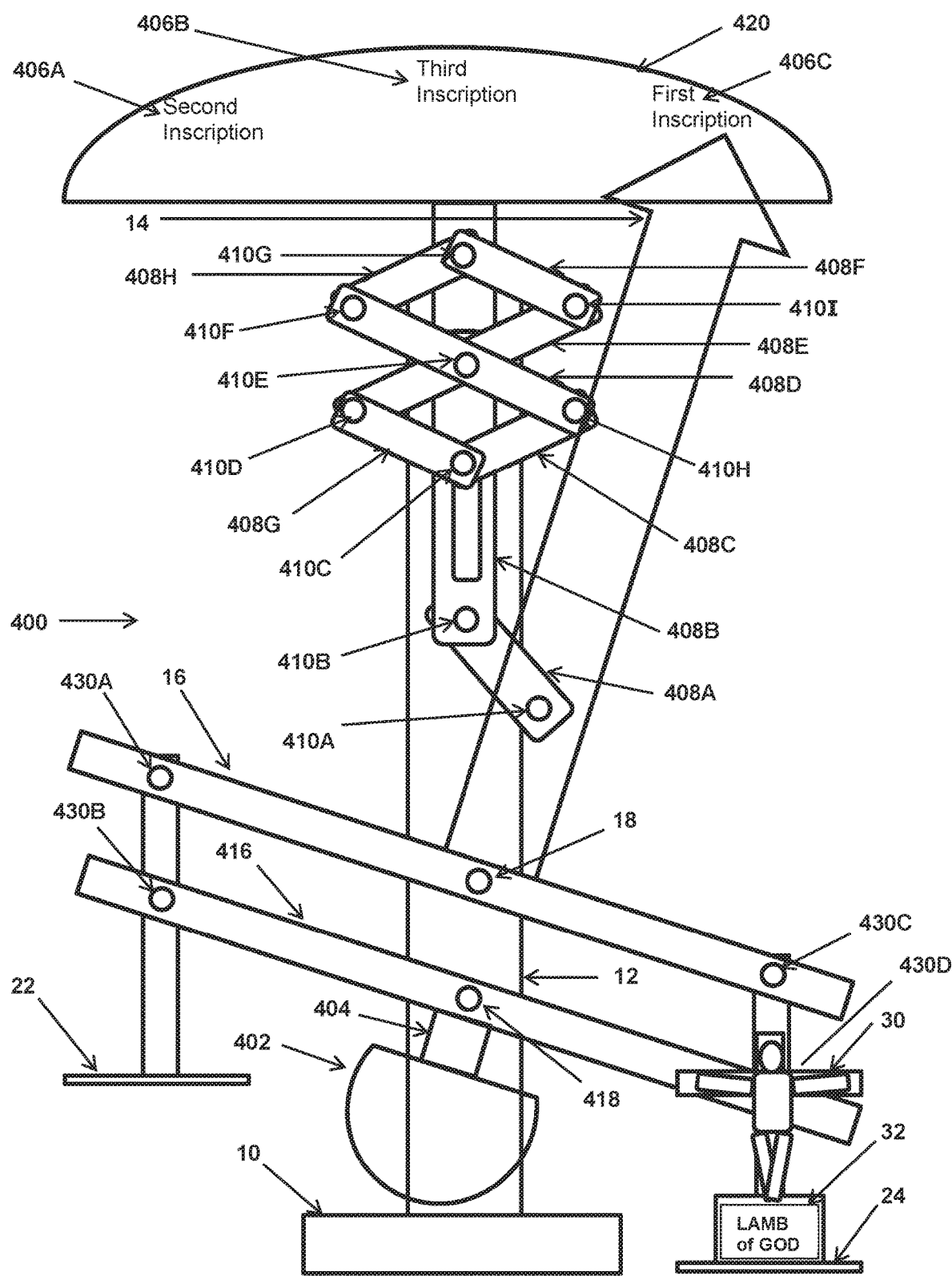
FIG. 14 is the alternate balance scale 400 of FIG. 13 shown with the sacrifice of Jesus alone.
Figure 15:
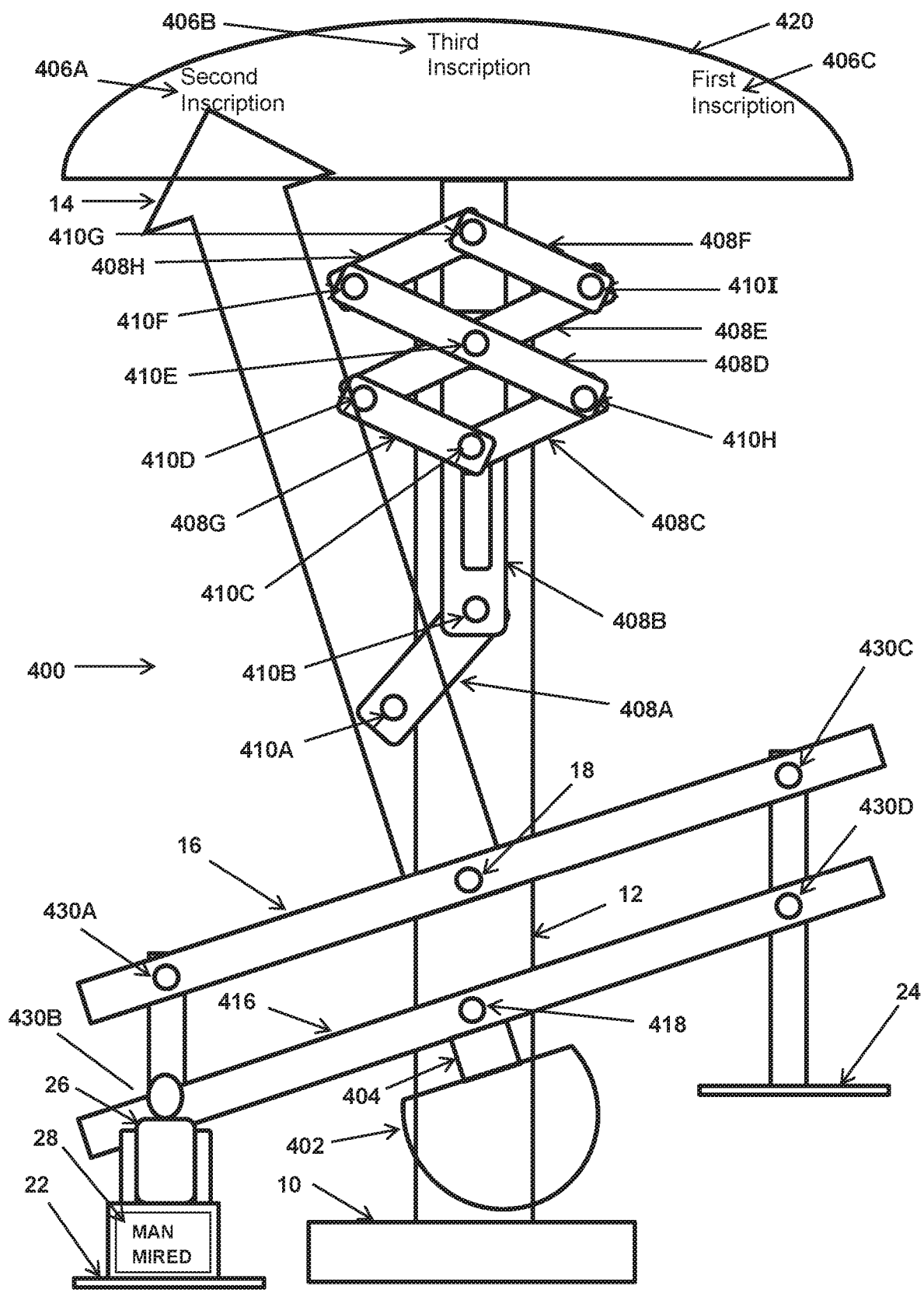
FIG. 15 is the alternate balance scale 400 of FIGS. 13 and 14 shown with the sins of man unredeemed by the sacrifice of Jesus.

Referring now to FIGS. 13-15, there is illustrated an alternate balance scale 400 that is constructed in accordance with an alternate preferred embodiment. The alternate balance scale 400 includes a counter-balance 402 that is located at either a lower end 404 of the pointer 14 or the bottom side of a 25 parallel beam 416, or both, which rotates on a pivot 418. The counter-balance 402 serves to help bring equally weighted trays 22 and 24 to an even level so that both the movable pointer 14 and the movable label plate 420 are aligned with the center of the alternate balance scale 400. This is depicted in FIG. 13 where the article of mankind 26 and the article of Christ's redemption 30 are of equal weight and are resting on trays 22 and 24, respectively. The trays 22 and 24 are pivotally secured via pivot points 430A, 430B, 430C and 430D to the balance arm 16 and parallel beam 416.

Referring now to FIGS. 14 and 15, when only one of the articles 26 or 30 is resting on its respective tray 22 or 24, the alternate balance 400 is not in equilibrium and the pointer 14 moves in the direction of the tray 22 or 24 on which the article 26 or 30 is resting, and the movable label plate 420 moves down. The movement of both the pointer 14 and the movable label plate 420 of the alternate balance scale 400 is illustrated in FIGS. 14 and 15.

Movement of both the pointer 14 and the movable label plate 420 allows for alternate sizes of labels 406A, 406B and 406C on the movable label plate 420, provides flexibility if the movable label plate 420 is bumped, aides in visual centering of the pointer 14, and aids in the entertainment feature of the alternate balance scale 400.

In order for the movable label plate 420 to move in conjunction with the pointer 14 in this fashion, linkage of several pivoting arms 408A, 408B, 408C, 408D, 408E, 408F, 408G and 408H that are pivotally secured via pivot points 410A, 410B, 410C, 410D, 410E, 410F, 410G, 410H and 410I to the pointer 14 and to the vertical balance arm support 12 cooperate to cause movement of the movable label plate 420 in response to movement of the pointer 14, as illustrated in the drawings and particularly in FIGS. 14 and 15.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A visually demonstrative device for sharing the good news of Jesus Christ's redemptive power comprising, the visually demonstrative device having a right side and a left side:

a base, a support post secured centrally to the base and extending upward vertically from the base, a balance beam pivotally secured to the support post at a fulcrum point, said balance beam extending horizontally on either side of the support post, each end of the balance beam supporting a holding tray for holding removable objects, a parallel beam that is pivotally secured to the support post at a pivot point below said fulcrum point, said parallel beam having a bottom side, said balance beam being provided centrally with a pointer having opposite ends, wherein the pointer extends perpendicular to the balance beam and points upward toward a moveable scale sign provided on the top end of the support post, said moveable scale sign moving in conjunction with movement of said pointer, said pointer pivoting in conjunction with pivoting motion of the balance beam, a counter balance is situated either on an opposite end of said pointer, on the bottom side of said parallel beam, or on both an opposite end of said pointer and on the bottom side of said parallel beam, a first object being a statue of Jesus Christ hanging on a cross with the function of providing a visual representation of the price paid for mankind's redemption, and supported by a base for the cross bearing a first inscription, said statue of Jesus Christ removably placed on a first tray of the two holding trays, a second object being a statue of a human embedded in or near a block or pile of rags representing sin with the function of providing visual representation of mankind unable to redeem themselves from sin and having a sign bearing a second inscription, said statue of a human removably placed on a second tray of the two holding trays, said moveable scale sign bearing three inscriptions, a first inscription of the three inscriptions on said moveable scale sign being located on the same side of said moveable scale sign as the holding tray bearing the statue of Jesus Christ, a second inscription of the three inscriptions on said moveable scale sign being located on the same side of said moveable scale sign as the holding tray bearing the statue of a human where it is understood that if the first object and the first inscription are on the right side of the visually demonstrative device, then the second object and the second inscription are on the left side of the visually demonstrative device, and likewise, if the first object and the first inscription are on the left side of the visually demonstrative device, then the second object and the second inscription are on the right side of the visually demonstrative device, a third inscription of the three inscriptions on said moveable scale sign being located centrally on said moveable scale sign, and the statue of Jesus Christ and the statue of the human having enough weight to serve as a mechanical function to rotate the balance beam, but being of approximately equal weight so that the balance beam is approximately level and the pointer points to the third inscription when the statue of Jesus Christ and the statue of the human are placed on their respective holding trays and so that the pointer points to the first inscription when the statue of a human is removed and points to the second inscription when the statue of Jesus Christ is removed.

2. A visually demonstrative device for sharing the good news of Jesus Christ's redemptive power according to claim 1 wherein the first inscription which appears in association with the statue of Jesus Christ is selected from the following inscriptions:

"Jesus", "Christ", "Jesus Christ", "Lamb of God", "Son of God", "Bread of Life", "Savior of the World", "Light of the World", "Rock of Salvation", "The Way, The Truth and the Life", and any other descriptive term or phrase for the person of Jesus Christ.

3. A visually demonstrative device for sharing the good news of Jesus Christ's redemptive power according to claim 2 wherein the second inscription which appears in association with the statue of the human is selected from the following inscriptions:

"Man Mired in Sin", "Man's Bondage to Sin", "Man Burdened with Sin", "Man's Sin Debt", "Man's Sinful State", "Man's Natural State", and any other descriptive term or phrase for a human that has never accepted Jesus Christ as their savior and has not been saved by his redemptive blood shed on the cross.

4. A visually demonstrative device for sharing the good news of Jesus Christ's redemptive power according to claim 3 wherein the first of three inscriptions which appears on said moveable scale sign is selected from the following list:

"Jesus Christ's Vicarious Death", "Jesus Christ's Atoning Death", "Jesus Christ's Ransom Sacrifice", and any other descriptive term or phrase for the death, burial and resurrection of Jesus Christ which serves as an atoning sacrifice that is sufficient to pay the price for and redeem humans from their sins and give them eternal life if they will accept Jesus Christ as their Savior.

5. A visually demonstrative device for sharing the good news of Jesus Christ's redemptive power according to claim 4 wherein the second of three inscriptions which appears on said moveable scale sign is selected from the following list:

"Sin Debt Unpaid", "Sin Debt Still Owed", "Sin Debt Charged Against Mankind", or any other descriptive term or phrase for the lost and condemned state of a human who is sinful by nature and deserves death and who has not accepted the free salvation and eternal life available through trusting in Jesus Christ as their personal Savior.

6. A visually demonstrative device for sharing the good news of Jesus Christ's redemptive power according to claim 5 wherein the third of three inscriptions which appears on said moveable scale sign is selected from the following list:

"Sin Debt Paid in Full", "Mankind Bought at a Price", "Mankind Bought by Christ", and any other term or phrase that describes the fact that a human is saved from the punishment of their sins and is given eternal life by the price that Jesus Christ paid on the cross with his death, burial and resurrection if they will accept him as their Lord and Savior.

7. A visually demonstrative device for sharing the good news of Jesus Christ's redemptive power according to claim 1 wherein the second inscription which appears in association with the statue of the human is selected from the following inscriptions:

"Man Mired in Sin", "Man's Bondage to Sin", "Man Burdened with Sin", "Man's Sin Debt", "Man's Sinful State", "Man's Natural State", and any other descriptive term or phrase for a human that has never accepted Jesus Christ as their savior and has not been saved by his redemptive blood shed on the cross.

8. A visually demonstrative device for sharing the good news of Jesus Christ's redemptive power according to claim 1 wherein the first of three inscriptions which appears on said moveable scale sign is selected from the following list:

"Jesus Christ's Vicarious Death", "Jesus Christ's Atoning Death", "Jesus Christ's Ransom Sacrifice", and any other descriptive term or phrase for the death, burial and resurrection of Jesus Christ which serves as an atoning sacrifice that is sufficient to pay the price for and redeemed humans from their sins and give them eternal life if they will accept Jesus Christ as their Savior.

9. A visually demonstrative device for sharing the good news of Jesus Christ's redemptive power according to claim 1 wherein the second of three inscriptions which appears on said moveable scale sign is selected from the following list:

"Sin Debt Unpaid", "Sin Debt Still Owed", "Sin Debt Charged Against Mankind", or any other descriptive term or phrase for the lost and condemned state of a human who is sinful by nature and deserves death and who has not accepted the free salvation and eternal life available through trusting in Jesus Christ as their personal Savior.

10. A visually demonstrative device for sharing the good news of Jesus Christ's redemptive power according to claim 1 wherein the third of three inscriptions which appears on said moveable scale sign is selected from the following list:

"Sin Debt Paid in Full", "Mankind Bought at a Price", "Mankind Bought by Christ", and any other term or phrase that describes the fact that a human is saved from the punishment of their sins and is given eternal life by the price that Jesus Christ paid on the cross with his death, burial and resurrection if they will accept him as their Lord and Savior.

11. A visually demonstrative device for sharing the goods news of Jesus Christ's redemptive power according to claim 1, wherein said moveable scale sign moves either side-to-side via a parallel-type linkage means or up-and-down via a scissor-type linkage means.

12. A visually demonstrative device for sharing the good news of Jesus Christ's redemptive power comprising, the visually demonstrative device having a right side and a left side:
- a base, a support post secured centrally to the base and extending upward vertically from the base, a balance beam pivotally secured to the support post at a fulcrum point, said balance beam extending horizontally on either side of the support post, each end of the balance beam supporting a holding tray for holding removable objects,
- said balance beam being provided centrally with a pointer that pointer extends perpendicular to the balance beam and points upward toward a moveable scale sign provided on the top end of the support post, said moveable scale sign moving in conjunction with movement of said pointer, said pointer pivoting in conjunction with pivoting motion of the balance beam, said pointer having a counter-balance on an opposite end past the pivotally secured fulcrum point,
- a first object being a statue of Jesus Christ hanging on a cross with the function of providing a visual representation of the price paid for mankind's redemption, and supported by a base for the cross bearing a first inscription, said statue of Jesus Christ removably placed on a first tray of the two holding trays,
- a second object being a statue of a human embedded in or near a block or pile of rags representing sin with the function of providing visual representation of mankind unable to redeem themselves from sin and having a sign bearing a second inscription, said statue of a human removably placed on a second tray of the two holding trays,
- said moveable scale sign bearing three inscriptions, a first inscription of the three inscriptions on said moveable scale sign being located on the same side of said moveable scale sign as the holding tray bearing the statue of Jesus Christ, wherein said moveable scale sign moves either side-to-side via a parallel-type linkage means or up-and-down via a scissor-type linkage means
- a second inscription of the three inscriptions on said moveable scale sign being located on the same side of said moveable scale sign as the holding tray bearing the statue of a human where it is understood that if the first object and the first inscription are on the right side of the visually demonstrative device, then the second object and the second inscription are on the left side of the visually demonstrative device, and likewise, if the first object and the first inscription are on the left side of the visually demonstrative device, then the second object and the second inscription are on the right side of the visually demonstrative device,
- a third inscription of the three inscriptions on said moveable scale sign being located centrally on said moveable scale sign, and
- the statue of Jesus Christ and the statue of the human having enough weight to serve as a mechanical function to rotate the balance beam, but being of approximately equal weight so that the balance beam is approximately level and the pointer points to the third inscription when the statue of Jesus Christ and the statue of the human are placed on their respective holding trays and so that the pointer points to the first inscription when the statue of a human is removed and points to the second inscription when the statue of Jesus Christ is removed.

* * * * *

UNITED STATES PATENT AND TRADEMARK OFFICE
CERTIFICATE OF CORRECTION

PATENT NO. : 10,514,291 B2
APPLICATION NO. : 16/517531
DATED : December 24, 2019
INVENTOR(S) : John Francis Hammond, Jr.

It is certified that error appears in the above-identified patent and that said Letters Patent is hereby corrected as shown below:

In the Specification

Column 1, Line 44, please delete "His own Son," and replace it -- His own Son. --.

Column 1, Line 51, after "Furthermore," please insert -- it is --.

Column 5, Line 56, please delete the number "25" before the phrase "parallel beam 416".

In the Claims

Claim 8, Column 8, Line 46, please delete the word "redeemed" and replace it with -- redeem --.

Claim 12, Column 9, Line 21, please delete the word "pointer" before the word "extends".

Claim 12, Column 10, Line 11, please add a "," after the word "means".

Signed and Sealed this
Second Day of June, 2020

Andrei Iancu
*Director of the United States Patent and Trademark Office*